March 11, 1930.  W. W. WATERMAN  1,750,075
ANIMAL TRAP
Filed Jan. 23, 1929   2 Sheets-Sheet 1

William W. Waterman,
INVENTOR
BY Victor J. Evans
ATTORNEY

March 11, 1930. W. W. WATERMAN 1,750,075
ANIMAL TRAP
Filed Jan. 23, 1929 2 Sheets-Sheet 2
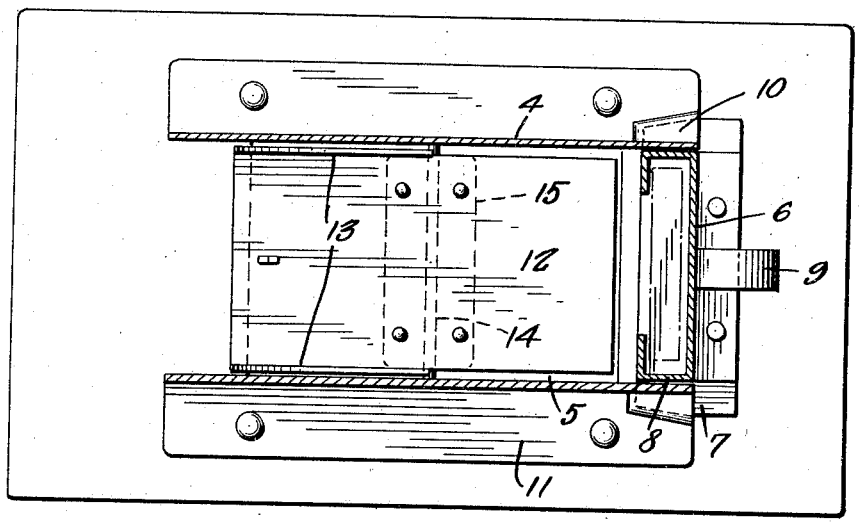
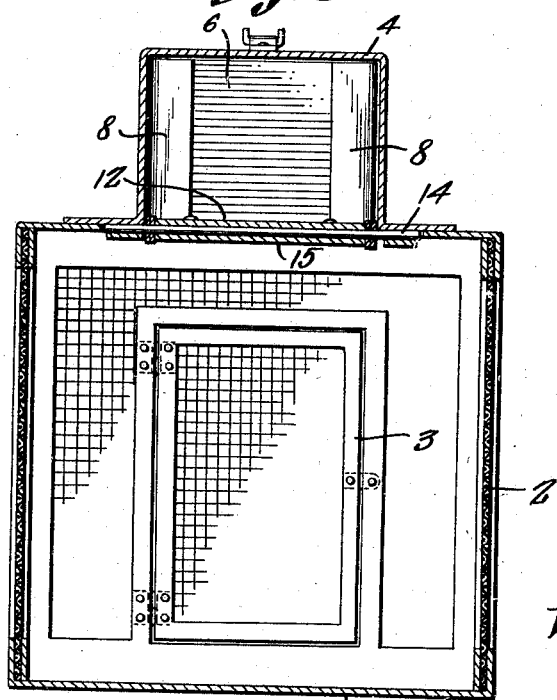
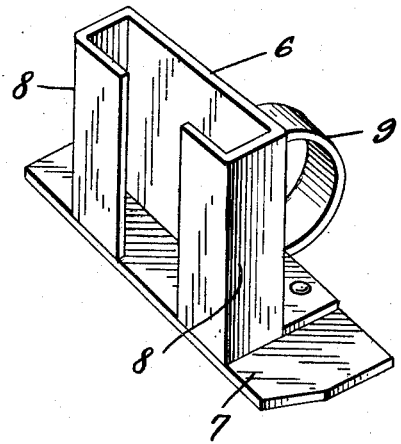
William W. Waterman, INVENTOR
BY Victor J. Evans ATTORNEY Patented Mar. 11, 1930

1,750,075

UNITED STATES PATENT OFFICE

WILLIAM WALTO WATERMAN, OF TULSA, OKLAHOMA

ANIMAL TRAP

Application filed January 23, 1929. Serial No. 334,456.

This invention relates to an animal trap, the general object of the invention being to provide a casing for receiving the animals, with a housing on the top of the casing having a trapdoor therein, with means for attracting animals into the housing so that when an animal enters the housing, it will step on the trapdoor so that the door will tilt under the weight of the animal and thus project the animal into the casing.

Another object of the invention is to so form the trapdoor that the exit of the animal from the housing will be closed when the trapdoor is in tilted position.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 2 is a horizontal section through the housing and the bait holder.

Figure 3 is a transverse sectional view.

Figure 4 is a perspective view of the bait holder.

Figure 1:
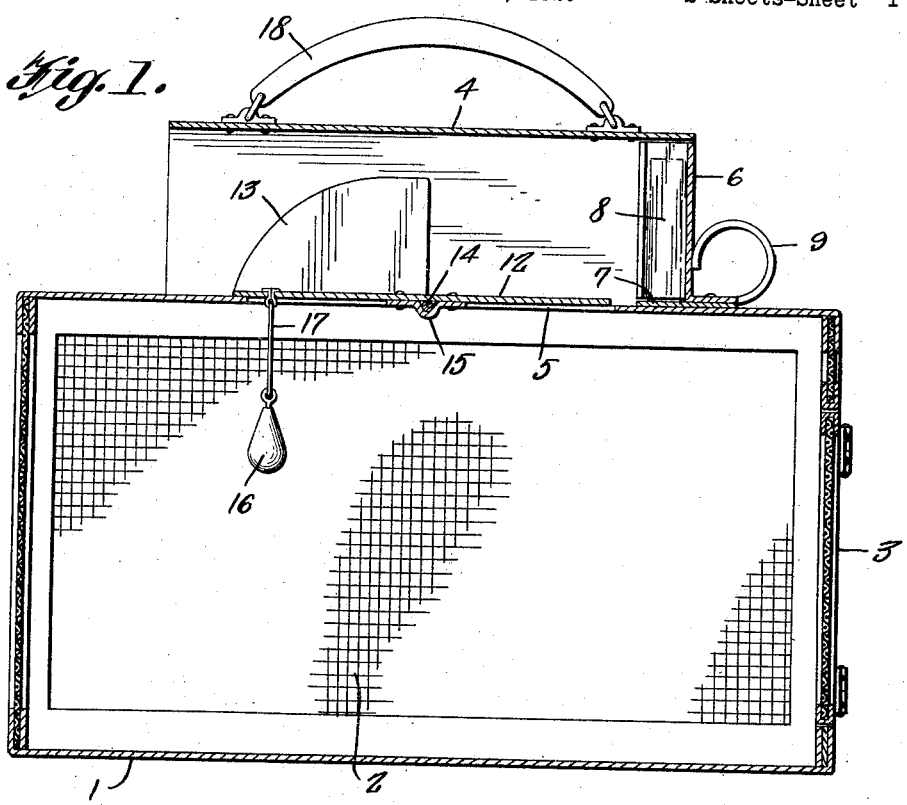
Figure 1 is a vertical sectional view through the trap.
Figure 5:
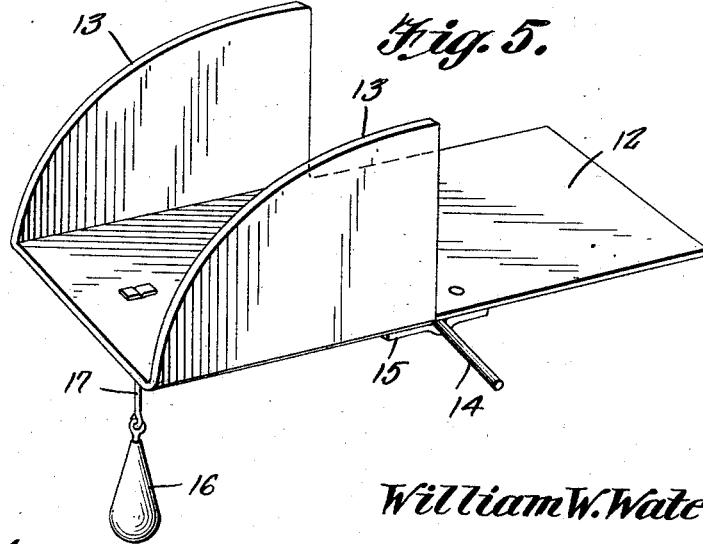
Figure 5 is a perspective view of the trapdoor.

In these views, the numeral 1 indicates the body or casing of the trap which is preferably formed of a metal frame having openings therein which are covered with wire gauze 2. A door 3 closes an opening in the rear end of the casing and serves the purpose of removing the animals caught by the trap. A housing 4 is fastened to the top of the trap forming opening 5 in said top. Both ends of the housing are open, but one end is adapted to be closed by a bait holder 6 which is formed of a base plate 7 and a channel-shaped body 8. The holder is also formed with a handle 9. The extended ends of the base plate are adapted to be pressed into the guideways 10 formed by raised portions of the flanges 11 of the housing which are secured to the casing. Thus when the holder is put in position, its body 8 will extend within the housing, as shown in Figures 1 and 2, with the opening in the body exposing the bait in the holder to an animal in front of the housing so that the animal will enter the housing to reach the bait. A trapdoor, composed of a plate 12, with the side pieces 13 at its front, is pivotally arranged in the housing above the opening 5 by having its trunnions 14 engaging the bearing pieces 15 on top of the casing. The forward end of the trapdoor overlaps the front wall of the opening 5 so that the trapdoor cannot tilt forwardly, but is permitted to tilt rearwardly. A weight 16 is attached to the forward end of the trapdoor by a cable 17 so that the weight tends to hold the trapdoor in horizontal or closed position, as shown in Figure 1. When an animal enters the housing to reach the bait, it must pass over the trapdoor and when the animal reaches the rear part of the trapdoor, its weight will overbalance the weights 16 so that the door will tilt and thus project the animal into the casing. Then the weight closes the trapdoor again. The front portions of the side walls 13 are curved, as shown, so that as the trapdoor is tilted, these curved portions will permit the door to move upwardly until its front end strikes the top of the housing or nearly so, so that an animal cannot escape from the housing. A handle 18 is attached to the top of the housing so that the trap can be carried from place to place.

From the foregoing it will be seen that I have provided simple means for trapping animals and that the trap sets itself after each animal is caught.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A trap of the class described comprising a casing having an opening in its top, a housing on top of the casing covering the opening, a hinged door in the housing over the opening, the front end of the door resting upon the front wall of the opening, with the rear end terminating short of the rear wall of the opening so that the rear part of the door can pass through the opening when the door is tilted, a weight on the front end of the door, a bait holder closing the rear end of the housing, said bait holder including a base plate and an upright hollow body having an opening in its front for exposing the bait, guiding means at the rear end of the housing for receiving portions of the base plate, said door having side pieces at its front with their front edges curved.

In testimony whereof I affix my signature.

WILLIAM WALTO WATERMAN.